(12) United States Patent
Brinen

(10) Patent No.: US 6,391,817 B1
(45) Date of Patent: *May 21, 2002

(54) METHOD FOR PRODUCING A PREPOLYMERIZED CATALYST

(75) Inventor: Jeffrey L. Brinen, League City, TX (US)

(73) Assignee: ExxonMobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/401,514

(22) Filed: Mar. 10, 1995

Related U.S. Application Data

(63) Continuation-in-part of application No. 08/174,498, filed on Dec. 28, 1993, now abandoned.

(51) Int. Cl.$^7$ ................................................. B01J 31/00
(52) U.S. Cl. ........................ 502/117; 502/102; 502/103
(58) Field of Search ................................. 502/117, 102, 502/103

(56) References Cited

U.S. PATENT DOCUMENTS

| | | |
|---|---|---|
| 4,808,561 A | 2/1989 | Welborn, Jr. |
| 4,897,455 A | 1/1990 | Welborn, Jr. |
| 4,912,075 A | 3/1990 | Chang |
| 4,921,825 A | 5/1990 | Kioka et al. |
| 4,923,833 A | 5/1990 | Kioka et al. |
| 4,937,217 A | 6/1990 | Chang |
| 4,937,301 A | 6/1990 | Chang |
| 5,001,205 A * | 3/1991 | Hoel ............. 526/126 |
| 5,008,228 A | 4/1991 | Chang |
| 5,055,438 A | 10/1991 | Canich |
| 5,086,025 A | 2/1992 | Chang |
| 5,120,696 A | 6/1992 | Tsutsui et al. |
| 5,126,301 A | 6/1992 | Tsutsui et al. |
| 5,145,819 A | 9/1992 | Winter et al. |
| 5,147,949 A | 9/1992 | Chang |
| 5,240,894 A | 8/1993 | Burkhardt et al. |
| 5,266,544 A | 11/1993 | Tsutsui et al. |
| 5,296,565 A * | 3/1994 | Ueda et al. ......... 526/114 |

FOREIGN PATENT DOCUMENTS

| | | |
|---|---|---|
| EP | 0 129 368 | 12/1984 |
| EP | 0 277 003 | 3/1988 |
| EP | 0 279 863 | 3/1988 |
| EP | 0 277 004 | 8/1988 |
| EP | A 0279586 | 8/1988 |
| EP | A 0354893 | 2/1990 |
| EP | A 0442725 | 8/1991 |
| EP | 0 447 071 | 9/1991 |
| EP | 0 566 349 | 10/1993 |
| EP | A 0598543 | 5/1994 |
| WO | 91/09882 | 7/1991 |

* cited by examiner

*Primary Examiner*—Elizabeth D. Wood
(74) *Attorney, Agent, or Firm*—Paige Schmidt; Douglas W. Miller; Kevin M. Faulkner

(57) ABSTRACT

A method for controlling fouling in a prepolymerization reactor is disclosed and comprises combining a supported metallocene catalyst system, an alpha olefin monomer feed, and added hydrogen under suitable prepolymerization reaction conditions. This method is also useful for the control of agglomeration during a prepolymerization reaction.

31 Claims, No Drawings

METHOD FOR PRODUCING A PREPOLYMERIZED CATALYST

This is a Continuation-in-Part of U.S. application Ser. No. 08/174,498, filed Dec. 28, 1993, now abandoned.

FIELD OF THE INVENTION

This invention relates generally to a catalyst system for the polymerization of olefins, more specifically, to the prepolymerization of supported catalyst systems and the use thereof

BACKGROUND OF THE INVENTION

Supported metallocene catalyst systems are used primarily in slurry, bulk liquid, and gas-phase polymerization processes. In general the catalyst systems and various methods to make them from transition metal components and activators are well known and exploited. These supported catalyst systems may be subjected to a prepolymerization step to enhance performance. Prepolymerization often confers the advantages of reduced fines formation, and superior product properties such as better granular morphology, higher bulk density, and improved granule flow properties. See EPA 447,071.

EPA 279,863 discloses a method for preparing a supported, prepolymerized metallocene catalyst system. The specific metallocene used is $Cp_2ZrCl_2$ which is supported on silica and prepolymerized with ethylene. EPA 279,863 suggests using a molecular weight controlling agent such as hydrogen to produce a prepolymer having certain intrinsic viscosities. Applicants have found that certain low activity catalyst systems containing certain metallocenes such as $Cp_2ZrCl_2$ may be supported and prepolymerized without fouling the prepolymerization reactor and without producing agglomerated catalyst particles.

However, other catlyst systems, such as high activity catalyst systems tend to foul the prepolymerization reactor and/or produce agglomerated catalyst system particles. It would be highly desirable to have an efficient method for using such catalyst systems without fouling and agglomeration in the prepolymerization reactor.

SUMMARY OF THE INVENTION

This invention relates to a method for yielding a non-fouling, non-agglomerating supported prepolymerized catalyst system. The invention involves use of hydrogen to control the fouling and agglomeration observed during pre-polymerization of high activity supported catalyst systems which tend to foul during prepolymerization.

The invention relates to a method for controlling fouling in a prepolymerization reactor, said method comprising the step of combining:

(a) a supported metallocene catalyst system having an activity greater than about 100,000 g/g/hr.;
(b) at least one alpha olefin monomer feed; and,
(c) added hydrogen under suitable prepolymerization reaction conditions. Ethylene and/or propylene are used as the preferred monomer feed for the prepolymerization of these supported catalysts.

Preferably, the metallocene catalyst system of this invention has a known tendency to foul a prepolymerization reactor and/or produce agglomerated catalyst system particles upon prepolymerization. Even more preferably, the metallocene catalyst system has an activity of from about 100,000 g polymer/g metallocene/hr to about 1,000,000 g polymer/g metallocene/hr. preferably greater than 150,000 g polymer/g metallocene/hr., even more preferably greater than 200,000 g polymer/g metallocene/hr. or from about 150,000 g polymer/g metallocene/hr to about 900,000 g polymer /g metallocene/hr., preferably from about 200,000 g polymer /g metallocene/hr to about 500,000 g polymer/g metallocene/hr.

Hydrogen is generally added in an amount of from about 0.1 to about 10 mole percent relative to the monomer feed rate. The monomer feed is generally added at a rate of about 0.1 to about 10 g olefin/g catalyst solid/hour. Suitable prepolymerization reaction conditions are typically run at low temperatures, for example in the range of from about −20° C. to about 40° C., preferably from about −10° C. to about 20° C., most preferably from about 0° C. to about 10° C.

Still further, the invention relates to use of the prepolymerized catalyst system formed by the method described herein and further relates to a method for controlling agglomermation of catalyst particles during the prepolymerization procedure.

DETAILED DESCRIPTION OF THE PREFERRED EMBODIMENTS

Prepolymerization reactor fouling and catalyst agglomeration which are observed during the prepolymerization of some metallocene catalyst systems, particularly high activity metallocene catalyst systems, can be minimized or eliminated by the use of hydrogen during prepolymerization. In a preferred embodiment, a supported metallocene catalyst system having high activity, monomer feed containing at least one alpha olefin, and added hydrogen are combined in a prepolymerization reactor, under suitable prepolymerization reaction conditions to control fouling and agglomeration of the supported catalyst system during prepolymerization. A further embodiment of the invention relates to the use of the prepolymerized supported catalyst system prepared by the method described herein for the polymerization of olefins to polyolefins.

For purposes of this application and claims, the phrase "added hydrogen" is defined to mean hydrogen which is purposely added during the prepolymerization reaction. Hydrogen which may be generated in-situ is excluded from this definition. Fouling is defined occurs when material sticks to the walls of the reactor. Agglomeration occurs when the catalyst system particles stick to each other. Fouling and agglomeration may or may not occur together.

As used herein, "metallocene" and "metallocene catalyst component" mean those bulky ligand transition metal compounds represented by the formula:

$Cp_mMR_nX_q$ wherein Cp is a cyclopentadienyl ring or derivative thereof, M is a Group 4, 5,or 6 transition metal and/or a metal from the lanthanide or actinide series, R is a hydrocarbyl group or hydrocarboxy group having from 1 to 20 carbon atoms, X is a halogen, and m=1–3, n=0–3, q=0–3, and the sum of m+n+q is equal to the oxidation state of the transition metal. The metallocene may be bridged or unbridged, and include heteroatoms in the structure. In addition, one or more bulky ligands may be τ-bonded to the transition metal atom. Other ligands may be bonded to the transition metal, for example, a leaving group, such as but not limited to hydrocarbyl, hydrogen or any other univalent anionic ligand. Non-limiting examples of metallocenes and metallocene catalyst systems are discussed in for example, U.S. Pat. Nos. 4,530, 914, 4,952,716, 5,124,418, 4,808,561, 4,897,455, 5,278,264, 5,278,119, 5,304,614 all of which are herein fully incorporated by reference. Also, the disclosures of EP-A-0 129 368, EP-A-0 591 756, EP-A-0 520 732, EP-A-0 420 436, WO 91/04257 WO 92/00333, WO 93/08221, and WO 93/08199 are all fully incorporated herein by reference. The preferred transition metal component of the catalyst system of the invention are those of Group 4, particularly, zirconium, titanium and hafnium. The transition metal may be in any oxidation state, preferably +3 or +4 or a mixture thereof.

Preferred metallocenes comprise a Group 4, 5, or 6 transition metal, biscyclopentadienyl derivatives, preferably bridged bis-indenyl metallocene components having the following general structure:

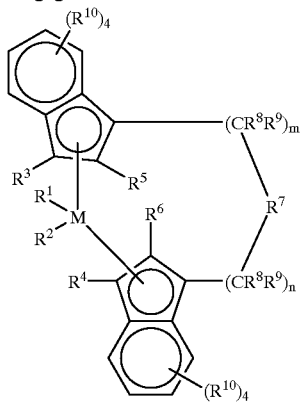

wherein $M^1$ is a metal of Group 4, 5, or 6 of the Periodic Table, for example titanium, zirconium, hafnium, vanadium niobium, tantalum, chromium, molybdenum and tungsten, preferably, zirconium, hafnium and titanium, most preferably zirconium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$-arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

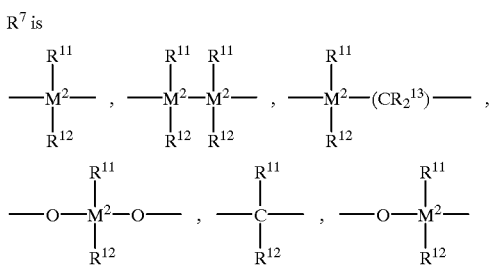

$=BR^{11}$, $=AlR^{11}$, —Ge—, —Sn—, —O—, —S—, $=SO$, $=SO_2$, $=NR^{11}$, $=CO$, $PR^{11}$, or $=P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

(A)

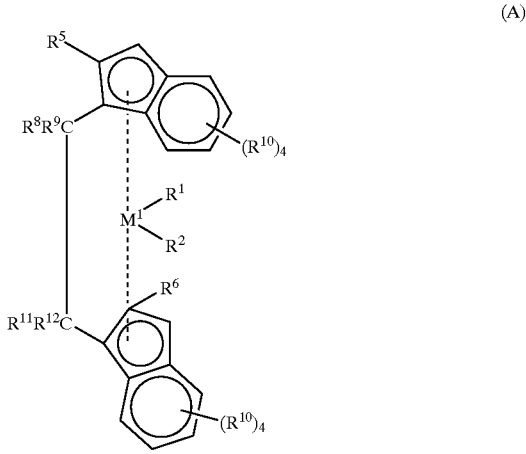

(B)

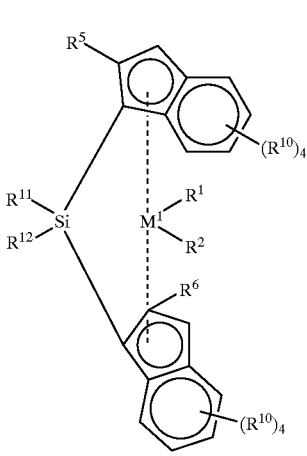

wherein:

M$^1$ is Zr or Hf, R$^1$ and R$^2$ are methyl or chlorine, and R$^5$, R$^6$ R$^8$, R$^9$, R$^{10}$, R$^{11}$ and R$^{12}$ have the above-mentioned meanings.

The chiral metallocenes are used as a racemate for the preparation of highly isotactic polypropylene copolymers.

It is also possible to use either the pure R or S form. An optically active polymer can be prepared with these pure stereoisomeric forms. It is preferred that the meso form of the metallocenes be removed to ensure the center (i.e., the metal atom) provides stereoregular polymerization.

Separation of the stereoisomers can be accomplished by known literature techniques. For special products it is also possible to use rac/meso mixtures.

Generally, the metallocenes are prepared by a multi-step process involving repeated deprotonations/metallations of the aromatic ligands and introduction of the bridge and the central atom by their halogen derivatives. The following reaction scheme illustrates this generic approach:

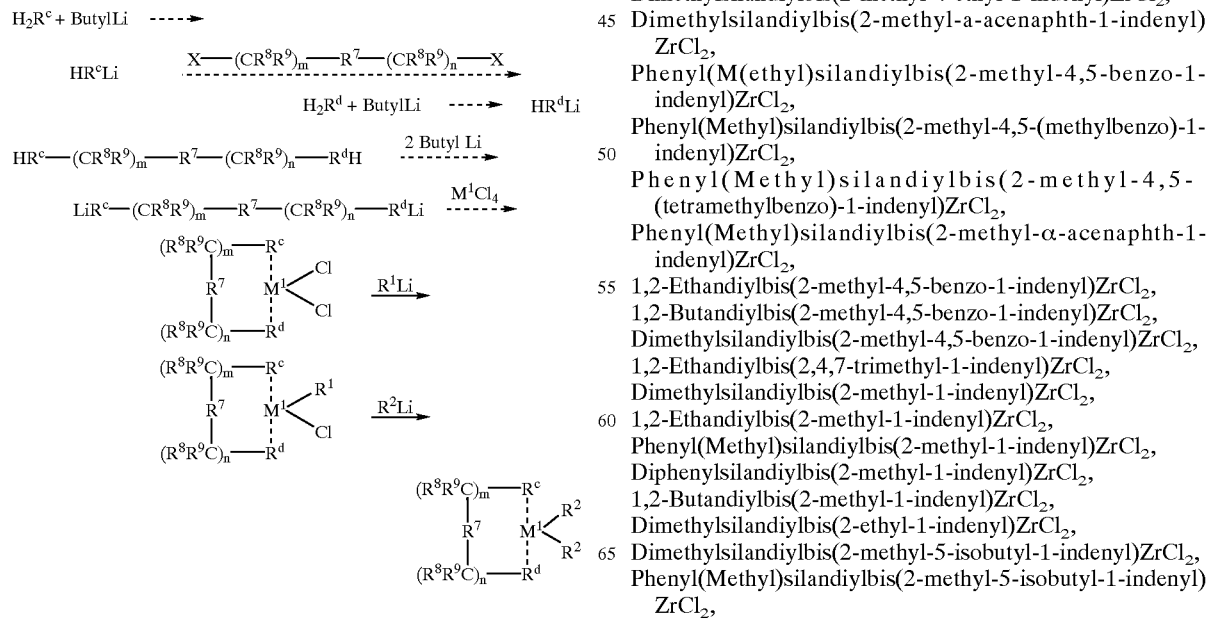

X = Cl, Br, I or O-tosyl;

The reader is referred to the *Journal of Organometallic Chem.*, volume 288 (1958), pages 63–67, and EP-A-320762, for preparation of the metallocenes described, both references are herein fully incorporated by reference.

Illustrative but non-limiting examples of metallocenes include:
Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl) ZrCl$_2$;
Dimethylsilandiylbis(2-ethyl-4-phenyl-1-indenyl)ZrCl$_2$;
Dimethylsilandiylbis(4-naphthyl-1-indenyl)ZrCl$_2$,
Phenyl(Methyl)silandiylbis(2-methyl-4-phenyl-1-indenyl) ZrCl$_2$,
Dimethylsilandiylbis(2-methyl-4-(1-naphthyl)-1-indenyl) ZrCl$_2$,
Dimethylsilandiylbis(2-methyl-4-(2-naphthyl)-1-indenyl) ZrCl$_2$,
Dimethylsilandiylbis(indenyl)ZrCl$_2$,
Dimethylsilandiylbis(2-methyl-4,5-diisopropyl-1-indenyl) ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilandiylbis(2-methyl-4-ethyl-1-indenyl)ZrCl$_2$,
Dimethylsilandiylbis(2-methyl-4-isopropyl-1-indenyl) ZrCl$_2$,
Dimethylsilandiylbis(2-methyl-4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-a-acenaphth-1-indenyl) ZrCl$_2$,
Phenyl(M(ethyl)silandiylbis(2-methyl-4,5-benzo-1-indenyl)ZrCl$_2$,
Phenyl(Methyl)silandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis(2-methyl-α-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl) ZrCl$_2$, Dimethylsilandiylbis(2-methyl-5-t-butyl-1-indenyl)ZrCl$_2$, Dimethylsilandiylbis(2,5,6-trimethyl-1-indenyl)ZrCl$_2$, and the like.

The preferred metallocene catalyst components of this invention are described in detail in U.S. Pat. Nos. 5,149,819, 5,243,001, 5,239,022, 5,296,434 arid 5,276,208 all of which are herein fully incorporated by reference. Also preferred are those catalysts described in U.S. Pat. No. 5,296,434 herein fully incorporated by reference.

The metallocenes discussed above are activated to form the active catalyst system or "metallocene catalyst system." The metallocene activator may be any compound or component which can activate a bulky ligand transition metal compound or a metallocene as defined above. Alumoxane may be used as the activator as well as ionizing activators, neutral or ionic. For example, compounds such as tri(n-butyl)ammonium bis(pentaflurophenyl)boron, which ionize the neutral metallocene compound, may be used as the activator. Examples of ionizing activators and methods of their production and use may be found in U.S. Pat. Nos. 5,153,157; 5,198,401; 5,241,025; 5,278,119; and 5,384,299 herein fully incorporated by reference.

Alumoxane is represented by the formula: R—(Al(R)—O)$_n$—AlR$_2$ for oligomeric linear alumoxanes and (—Al(R)—O—)$_m$ for oligomeric cyclic alumoxane wherein n and m are 1 to 40, preferably 3 to 20, and R is a C$_{1-8}$ alkyl group or R is an C$_{6-18}$ aryl group, or hydrogen, preferably a methyl group, or R can be mixtures of alkyl and aryl substituents. Alumoxane or methylalumoxane can be prepared by a variety of known processes such as those illustrated in, for example, U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; and 5,103,031 (each incorporated herein by reference).

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (each incorporated herein by reference). These teach a preferred method of preparation wherein metallocenes (bisCp and monoCp) are protonated by an anionic precursors such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerizaton process. Typically the anion will have a molecular size of greater than or equal to about 4 angstroms.

The use of ionizing ionic compounds not containing an active proton but capable of producing the both the active metallocene cation and an noncoordinating anion is also known. See, EP-A-0 426 637 and EP-A-0 573 403 (incorporated herein by reference). An additional method of making the ionic catalysts uses ionizing anionic pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anionic pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Methods of supporting ionic catalysts comprising metallocene cations and noncoordinating anions are described in WO91/09882, WO 94/03506 and in co-pending U.S. Ser. No. 08/248,284, filed Aug. 3 1994 (each incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

Typically, the support can be any organic or inorganic, inert solid, particularly, porous supports such as talc, inorganic oxides, and resinous support materials such as polyolefin. Suitable inorganic oxide materials that are desirably employed include Groups-2a, -3a, -4a, -4b, or -5b metal oxides such as silica, alumina, silica-alumina, and mixtures thereof. Other inorganic oxides that may be employed either alone or in combination with the silica, alumina, or silica-alumina are magnesia, titania, zirconia, and the like. Other suitable support materials can be employed such as, finely divided polyolefins, such as polyethylene.

Other examples of inorganic supports or carriers include SiO$_2$, Al$_2$O$_3$, MgO, ZrO$_2$, TiO$_2$, Fe$_2$O$_3$, B$_2$O$_3$, ZnO, ThO$_2$, and mixtures thereof such as silica-alumina, zeolite, ferrite, and glass fibers.

Generally, activation is carried out in a solution containing dissolved activator. When alumoxane is used as the activator the concentration, of alumoxane in the solution may range from about 1% by weight up to the saturation limit, preferably, from about 5% to about 30% by weight in each case based on the entire solution. The metallocene is dissolved in this solution such that the concentration of metallocene in solution may be up to the saturation limit. Preferably the atomic ratio of the alumoxane aluminum atom to the metallocene metal atom is from about 1 to about 1000, preferably about 10 to about 700, more preferably about 100 to about 400. The time required for activation may be from about 5 minutes or more, preferably from about 5 to about 60 minutes at a temperature ranging from about −78° C. to about 100° C., preferably from about 0° C. to about 40° C.

Alternatively, ionic activators may be used as described above in which case the activation may be carried out in solution at a temperature ranging from about −100° C. to about 300° C., preferably from about 0° C. to about 100° C. The time for reaction may range from about 10 seconds to about 60 minutes depending upon variables such as reaction temperature and choice of reactants.

The prepolymer formed during the prepolymerization may be a homopolymer or copolymer. If a copolymer is desired, monomer mixtures, such as ethylene-propylene, ethylene-butene or ethylene-hexene mixtures may be introduced into the prepolymerization reactor. Generally, the prepolymer is made up of one or more alpha olefins having between 2 and about 20 carbon atoms. Preferably the principle olefin contains between 2 and about 10 carbon atoms, most preferably 2 or 3 carbon atoms.

In a preferred embodiment, the hydrogen is generally added in an amount between about 0.1 to about 10 mole percent relative to the monomer feed rate under prepolymerization conditions. Hydrogen is preferably added at about 0.5 to about 6 mole percent and most preferably from about 1 to about 3 mole percent relative to the monomer feed rate.

In a preferred embodiment the olefin feed or monomer is polymerized onto the supported, solid, catalyst system thereby forming the prepolymer during the prepolymerization reaction. The olefin feed is preferably added during prepolymerization at a rate of from about 0.1 to about 10 g olefin/g catalyst solid/hour, more preferably from about 0.1 to about 5 g olefin/g catalyst solid/hour, and most preferably at a rate of from about 0.5 to about 1.5 g olefin/g catalyst solid/hour. Prepolymer contents of from about 0.05 to about 30 g prepolymer/g catalyst is an acceptable and general amount formed during the prepolymerization reaction. Preferably an amount of from about 0.1 to about 20 g prepolymer/g catalyst is formed, and most preferably an amount in the range of about 0.2 to about 10 g prepolymer/g catalyst is formed onto the supported catalyst system during the prepolymerization process.

Experiments for this invention were generally run with a calculated prepolymerization rate of about 0.5 to about 1.0 g prepolymer/g catalyst/hour using ethylene as the monomer. This rate resulted in no fouling or agglomeration of the prepolymerized supported catalyst system. Additionally, the prepolymerized catalyst had a granular morphology and was free flowing.

Preferred prepolymerization reaction conditions generally include low temperatures, for example, in the range of about −20 to about 40° C. Preferably the temperature during prepolymerization is in the range of about −10 to about 20° C. and most preferably is in the range of about 0 to about 10° C. Solvents suitable for use during the prepolymerization include inert hydrocarbons such as isopentane, hexane, and the like. A solvent is generally chosen so as it does not interact with the supported catalyst system. The reaction time is dependent upon the amount of prepolymer being formed on the catalyst.

In an embodiment of the invention, the supported catalyst system is a metallocene-alumoxane catalyst system supported on silica in accordance with the support technique described in U.S. Pat. No. 5,240,894, incorporated by reference. The support technique described in U.S. Pat. No. '894 involves production of a metallocene-alumoxane reaction product which is then placed on dehydrated silica and thoroughly dried prior to use. In an alternate embodiment, the catalyst system may be supported in accordance with that taught in U.S. Pat. Nos. 4,937,301 or 5,008,228 which involves adding the metallocene, and trimethylaluminum to a water impregnated or wet silica support. In a further alternate embodiment the catalyst may be supported in accordance with U.S. Pat. No. 4,808,561 which describes placing the metallocene on a methylalumoxane coated silica support. Any support technique generally useful for producing catalyst for use in gas phase or slurry polymerization is acceptable for the purposes of this invention. For example, support techniques described in U.S. Pat. Nos. 4,808,561; 4,897,455; 4,937,301; 4,937,217; 4,912,075; 5,008,228; 5,086,025; 5,147,949; and 5,240,894 may be employed, all references incorporated by reference. The examples herein describe supporting a catalyst in accordance with the techniques described in U.S. Pat. Nos. 5,240,894; 4,937,301; 4,808,561. The examples of the invention illustrate that the invention works well with a variety of techniques.

The invention is further illustrated by the following non limiting examples. All solvents were purchased from commercial sources, nitrogen purged and dried over activated molecular sieves. Unsubstituted $Cp_2ZrCl_2$ was purchased from commercial sources. Alumoxane solutions were purchased as 10–30 wt % solutions. Silica is Davison 948 (average particle=50 microns) dehydrated at either 200 or 800° C. under flow of nitrogen.

EXAMPLES

Comparative Example 1

Preparation of supported $Cp_2ZrCl_2$/methylalumoxane (MAO) catalyst system. The support technique employed was in accordance with U.S. Pat. No. 4,808,561. The activity of this catalyst system (unsupported, methylalumoxane activated) is estimated to be 15,000 g polymer/g metallocene/hour.

In an inert atmosphere dry box, 10.0 g of calcined silica obtained by calcining at 200° C. for 4 hours, 12.5 g of methyl alumoxane solution (MAO, commercially available from Ethyl Corp. as 30 wt. % in toluene, Lot #004667-3), and 25 cm³ of toluene were combined in a 200 ml flask while stirring. This mixture was heated to 55° C., and allowed to mix for 1 hour. In another flask, 0.152 g of $Cp_2ZrCl_2$ metallocene was dissolved in 10 cm³ of hexane. The metallocene solution was added to the silica/MAO mixture under slow stirring. After 30 minutes, the heat was removed, and the mixture was stirred for another 30 minutes. When the stirring was stopped, the solids settled to the bottom of the flask, and the supernatant liquid was decanted. Another 30 cm³ of hexane was added to the flask, and the mixture was stirred for 15 minutes. The solids were allowed to settle, the supernatant liquid was decanted, and the catalyst solids were dried under vacuum until no further change in weight was observed. The yield of supported catalyst system was 12.6 g.

Comparative Example 2

Prepolymerization of the catalyst system of Comparative Example 1—In an inert atmosphere dry box, 4.0 g of the supported catalyst of Example 1 were placed in a 946 cm³ (1 quart) glass reaction vessel with 150 cm³ of isopentane. The reactor head, equipped with an overhead stirrer and thermocouple, was installed, and the reactor was pressure tested at 1.38 bar (20 psi). The reactor was removed from the drybox, and connected to an ethylene feed manifold. The feed manifold was purged with nitrogen, the stirrer was started, and the reactor was placed in a silicon oil/dry ice bath in order to maintain the desired reaction temperature of 0° C. (32° F.). Once the reaction temperature was established, ethylene feed was introduced to the reactor. The rate of ethylene addition was set such that the rate of prepolymerization was 1.0 g ethylene per g catalyst solids per hour. Ethylene feed to the reactor was stopped after one hour reaction time. During the 1 hour duration of the experiment, no fouling or agglomeration of the solids in the reactor was observed. Upon completion of the ethylene addition, the reactor was isolated from the feed manifold, taken back inside the dry box, and the prepolymerized catalyst system solids were collected by suction filtration over a medium porosity fritted funnel. When dry, the prepolymerized catalyst system was a granular, free-flowing solid. The reactor walls and agitator were clean and free of fouling. The yield of prepolymerized catalyst system was 7.0 g.

Example 3

Preparation and prepolymerization without hydrogen of supported $(1,3\text{-MeBuCp})_2\text{ZrCl}_2/\text{MAO}$ catalyst system. The support technique employed was in accordance with U.S. Pat. No. 4,937,301. The activity of this catalyst system (unsupported, methylalumoxane activated) is estimated to be 43,500 g polymer/g metallocene/hour.

The metallocene is identified generically in EP 552946 and may be prepared in accordance with that described in EP 552946.

The prepolymerization procedure of Example 2 was repeated using 2.5 grams of supported $(1,3\text{-MeBuCp})_2\text{ZrCl}_2$, 75 cm$^3$ of isopentane, and a prepolymerization rate 0.67 g ethylene per g catalyst solids per hour. After 30 minutes of ethylene addition, an accumulation of solids was observed on the walls of the reactor. After 32 minutes, the solids in the reactor agglomerated severely. Ethylene feed was stopped after 90 minutes. The solids were collected by suction filtration. The solids contained agglomerates as large as 1.8 mm in diameter, and were not free-flowing. The yield of prepolymerized catalyst system was 4.4 g.

Example 4

Prepolymerization with hydrogen of supported $(1,3\text{-MeBuCp})_2\text{ZrCl}_2/\text{MAO}$ catalyst system.

The procedure of Example 3 was repeated with the exception that the monomer feed stream to the reactor was changed from pure ethylene to a mixture of 6 mol % hydrogen in ethylene. No fouling or agglomeration of the solids in the reactor were observed. After 90 minutes, the feed to the reactor was stopped. The prepolymerized catalyst was collected by suction filtration. The product was a granular, free-flowing solid, with no evidence of the agglomerates observed with the catalyst made in Example 3. The yield of prepolymerized catalyst was 4.1 g.

Example 5

Preparation of supported dimethylsilyl(2-Me,4,5-benzoinderyl)$_2$zrCl$_2$.

The metallocene catalyst component was prepared as follows:
Diethyl methyl(2-naphthylmethyl)malonate (1)

5.15 g (224 mmol) of sodium were dissolved in 150 ml of absolute ethanol, while heating, and 37.3 ml (217 mmol) of diethyl methylmalonate were added at room temperature. A solution of 50 g (217 mmol) of 2-bromomethylnaphthalene (96% pure) in 270 ml of ethanol was slowly added dropwise at 0° C., and the mixture was heated under reflux for a further 4 to 5 hours. It was poured onto ice-water and extracted with ethyl acetate. The combined organic phases were dried with sodium sulfate and evaporated. After drying under an oil pump vacuum, the oily residue was stirred with hexane at 0° C., whereupon 55 g (81%) of the compound 1 crystallized.
Synthesis of 2-Methyl-3-naphthylpropionic acid (2)

A solution of 23.7 g (422 mmol) of potassium hydroxide in 50 ml of water was added to 33.2 g (105 mmol) of the compound 1 in 70 ml of ethanol, and the mixture was heated under reflux for 4 hours. After the solvent had been stripped off, the solid residue was taken up in ethyl acetate, water was added and the pH was brought to 1 with hydrochloric acid. The aqueous phase was extracted several times with ethyl acetate. After drying over magnesium sulfate, the combined organic phases were evaporated completely. The residue was stirred with hexane for crystallization. For decarboxylation, the beige-colored solid was heated at 175° C. until the evolution of gas had ended. 21 g (94%) of the product 2 were obtained as a beige-colored solid.
Synthesis of 2-Methyl-6,7-benzoindan-1-one (3)

22 ml of thionyl chloride were added to 21 g (98 mmol) of the compound 2, with exclusion of moisture, and the mixture was heated under reflux for 30 minutes. Excess thionyl chloride was then distilled off. The residue was briefly freed from volatile compounds under an oil pump vacuum and then dissolved in 25 ml of methylene chloride, under Ar as an insert gas. The solution was slowly added dropwise to a suspension of 26 g (196 mmol) of aluminum trichloride in 60 ml of methylene chloride and the mixture was heated under reflux for a further 30 minutes. It was poured onto ice and extracted with methylene chloride. The combined organic phases were dried with sodium sulfate and evaporated. The dark oily residue was chromatographed on 600 g of silica gel 60. 8.6 g (45%) of the compound 3 were able to be eluted (yellowish solid) with a mobile phase mixture of hexane/ethyl acetate (9:3).
Synthesis of 2-Methyl-4,5-benzoindene (4)

2.2 g (59.5 mmol) of sodium borohydride were added in portions to a solution of 7.8 g (39.7 mmol) of the indanone, compound 3 in 400 ml of a tetrahydrofuran/methanol mixture (2:1) at room temperature, and the mixture was stirred for 14 hours. The solution was poured onto HCL-acid ice and extracted with ether. The combined organic phases were washed several times with water and dried with sodium sulfate. The orange-colored oil which remained after the solvent had been stripped off was dissolved in 240 ml of toluene, and the solution was heated at 80° C. with 570 mg (3.15 mmol) of p-toluene-sulfonic acid for 15 minutes. It was washed several times with water at room temperature, dried with sodium sulfate and evaporated. The residue was chromatographed on 300 g of silica gel 60. 4.7 g (65%) of the indene 4 were able to be eluted (colorless oil) with a mobile phase mixture of hexane/diisopropyl ether (20: 1).

$^1$H-NMR spectrum (360 MHz, CDCL3): 8.02 (1,d), 7.84 (1,m), 7.59 (1,d), 7.52 (1,d), 7.38–7.48 (2,m), 7.06 (1,m), 3.42 (2,s), 2.25 (3,d).
Synthesis of Dimethylbis(2-methyl-4,5-benzoindenyl)silane (5)

10.2 ml (25.5 mmol) of a 2.5 M butyllithium solution in hexane were added to a solution of 4.6 g (25.5 mmol) of the compound 4 in 50 ml of tetrahydrofuran at room temperature, and the mixture was heated under reflux for 1 hour. The red solution was then added dropwise to a solution of 1.55 g (12 mmol) of dimethyldichlorosilane in 10 ml of tetrahydrofuran at room temperature, and the mixture was heated under reflux for 5 to 6 hours. The reaction solution was poured onto ice-water and extracted several times with ether. The combined organic phases were dried with sodium sulfate and evaporated, and the residue was dried under an oil pump vacuum. It was chromatographed on 300g of silica gel 60. 500 mg of unreacted starting compound 4 were initially able to be eluted with a mobile phase mixture of hexane/3% ethyl acetate. The ligand system, compound 5, then followed with the same mobile phase. After the solvent had been stripped off, this ligand system was crystallized (isomers) from hexane. The yield was 1.7 g (34%, or 44% with respect to the indene, compound 4 reacted).

Synthesis of rac—Dimethylsilanediylbis(2-methyl-4.5-benzo-indenyl)zirconium dichloride (6)

4.0 ml (10.2 mmol) of a 2.5 M butyllithium solution in hexane were added to a solution of 1.7 g (4.1 mmol) of compound 5 in 20 ml of tetrahyrofuran at room temperature under Ar as an inert gas, and the mixture was stirred at room temperature for 14 hours. The residue which remained after the solvent had been stripped off was dried using an oil pump vacuum and washed with hexane. The pale brown powder obtained was dried using an oil pump vacuum at 40 to 50° C. for several hours and added to a suspension of 1.0 g (4.0 mmol) of zirconium tetrachloride in 25 ml of methylene chloride at −78° C. After the mixture had been warmed to room temperature, the solvent was stripped off and the residue was extracted with 20 ml of toluene in order to remove the meso form of the metallocene, compound 6. The residue of the toluene extract was then extracted with 40 ml of methylene chloride. The solution was concentrated to a small volume and left to crystallize at −35° C. A total of 970 mg (42%) of the ziroconcene, compound 6 were isolated in several fractions as the pure racemate.

$^1$H-NMR spectrum of the racemate (300 MHz, $CDCL_3$): 7.96 (2,m), 7.78 (2,m), 7.60 (2,d), 7.48–7.56 (4,m), 7.36 (2,d), 7.27 (2,s,b-Ind-H), 2.37 (6,s,Ind-$CH_3$) 1.36 (6,s,Si-CH3). Mass spectrum: 574 $M^+$, correct disintegration, correct isotope pattern.

The catalyst component of Example 5 was combined with methylalumoxane and supported in accordance with U.S. Pat. No. 5,240,894. The activity of the unsupported, methylalumoxane activated catalyst system is estimated to be 360,000 g polymer/g metallocene/hour. The support technique is as follows:

3000 $cm^3$ of methylalumoxane solution (10% MAO in toluene commercially available from Witco Corporation) was added to a 37,855 $cm^3$ (10 gallon) jacketed reactor equipped with a helical agitator. To this was added a solution of 5.0 g of the dimethylsilyl(2-Me,4,5-benzoindenyl)$_2$ZrCl$_2$ metallocene in 700 $cm^3$ of toluene. After allowing this to mix for 15 minutes, 395.9 grams of silica (Davison 948, calcined at 800° C. for 4 hours) was added to the reactor. After mixing for 15 minutes, the toluene solvent was removed by evaporation at 65° C. (150° F.) under vacuum. After all the solvent had evaporated, the solids were held under vacuum at temperature for an additional 3 hours. The solids were slurried in isopentane, and recovered from the reactor. The solids were collected by filtration, and sparged with nitrogen to dryness. The yield of supported catalyst was 450 g.

Comparative Example 6

Prepolymerization without hydrogen of supported dimethylsilyl(2-Me,4,5-benzoindenyl)$_2$ ZrCl$_2$/MAO catalyst system The prepolymerization procedure of Example 2 was repeated using 2.5 g of the supported catalyst of Example 5. Ethylene addition was set such that the rate of prepolymerization was 0.57 g ethylene/g catalyst solid/hour.

After 33 minutes of ethylene feed, the solids in the reactor agglomerated severely. Ethylene feed was stopped after 35 minutes, and the solids were collected by suction filtration. The prepolymerized catalyst recovered contained agglomerated particles as large as 1.4 mm in diameter, and were not free-flowing. The yield of prepolymerized catalyst was 2.8 g.

Example 7

Prepolymerization with hydrogen of supported dimethylsilyl(2-Me,4,5-benzoindenyl)$_2$ ZrCl$_2$/MAO catalyst system.

The prepolymerization procedure of Example 6 was repeated using 2.5 g of the supported catalyst of Example 5. The monomer feed to the reactor was a mixture of 3.0 mol % hydrogen in ethylene. No fouling or agglomeration of the solids were observed during the 1.5 hour experiment. The prepolymerized catalyst was collected by suction filtration. The product was a granular, free-flowing solid, with no evidence of agglomerates. The yield of prepolymerized catalyst was 4.2 g.

Example 8

Prepolymerization with hydrogen of supported dimethylsilyl(2-Me,4,5-benzoindenyl)$_2$ ZrCl$_2$/MAO catalyst system.

202.1 g of the supported catalyst made in Example 5 was slurred in 6000 $cm^3$ in a 7,571 $cm^3$ (2 gallon) jacketed glass reactor equipped with a helical stirrer. The reactor was chilled to a temperature of 2° C. (36° F.), and then the feed to the reactor was initiated. For this experiment, the ethylene source was a cylinder of 1 mol % hydrogen in ethylene (commercially available and supplied by Scott Specialty Gases). The feed rate used was 1840 $cm^3$/min. (0.065 SCFM). A total of 170,000 $cm^3$ (6.01 SCF) were added to the reactor. During the 92 minute duration of the experiment, no fouling of the reactor walls or agitator was observed. Also, there was no evidence of agglomeration of the solids in the reactor. The agitator was stopped, and the solids were allowed to settle, and the supernatant liquid was decanted. The solids were washed twice with 3800 $cm^3$ of isopentane before collection. The solids were collected by filtration, and sparged to dryness with flowing nitrogen. When dry, the prepolymerized catalyst was a granular, free-flowing solid. The yield of prepolymerized catalyst system was 350.2 g.

It should be understood that modification and variations besides those specifically disclosed and exemplified may be made without substantially departing from the scope of this invention. The form of the invention is exemplary only and not intended as a limitation of the scope thereof.

What is claimed is:

1. A method for prepolymerizing a catalyst system comprising:
   (a) providing a catalyst system wherein the catalyst system has an activity greater than about 100,000 g/g/hr, and comprises a metallocene catalyst component and a support consisting essentially of an inorganic oxide provided that the support does not simultaneously include titanium, magnesium and halogen;
   (b) providing at least one alpha-olefin monomer feed at a feed rate;
   (c) providing hydrogen;
   (d) combining the catalyst system, alpha-olefin monomer feed, and hydrogen under prepolymerization reaction conditions; and (e) recovering a prepolymerized, non-fouling, non-agglomerating supported catalyst system.

2. The method of claim 1 wherein the inorganic oxide consists essentially of Group-2a, -3a, -4a, -4b, or -5b metal oxide.

3. The method of claim 1 wherein the inorganic oxide consists essentially of silica, magnesia, alumina, titania, zirconia, or their mixtures.

4. The method of claim 1 wherein the metallocene catalyst component has the following formula:

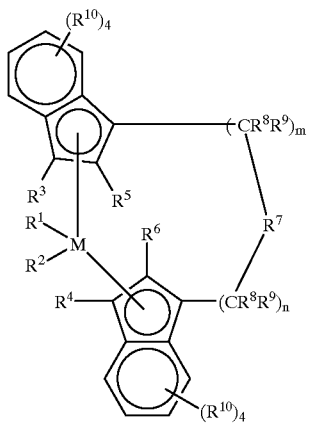

wherein

M is a metal of Group 4, 5, or 6 of the Periodic Table;

$R^1$ and $R^2$ are identical or different, and are one of a hydrogen atom, a $C_1$–$C_{10}$ alkyl group, a $C_1$–$C_3$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a halogenated or unhalogenated $C_1$–$C_{10}$ alkyl group, a halogenated or unhalogenated $C_6$–$C_{10}$ aryl group, a $C_2$–$C_{10}$ alkenyl group, a $C_7$–$C_{40}$ -arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

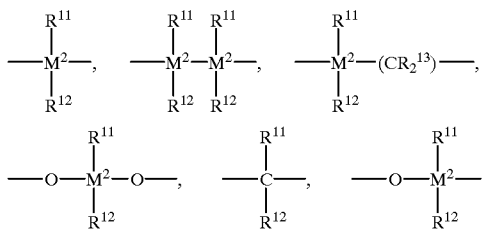

=$BR^{11}$, =$AR^{11}$, —Ge—, —Sn—, —O—, —S—, =SO, =$SO_2$, =$NR^{11}$, =CO, $PR^{11}$, or =$P(O)R^{11}$; wherein: $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$ can form ring systems with the atoms they are connected to;

$M^2$ is silicon, germanium or tin;

$R^8$ and $R^9$ are identical or different and have the meanings stated for $R^{11}$;

m and n are identical or different and are zero, 1 or 2, m plus n is zero, 1 or 2; and $R^{10}$ are identical or different radicals, and have the meanings stated for $R^{11}$, $R^{12}$ and $R^{13}$; two adjacent $R^{10}$ can be joined together to form a ring system.

5. The method of claim 1 wherein the metallocene component is represented by the formula:

(A)

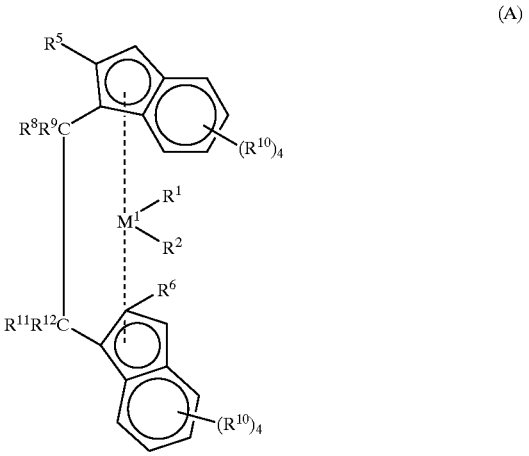

(B)

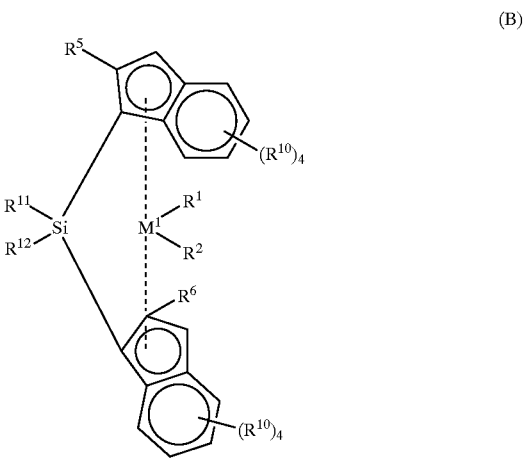

wherein:

$M^1$ is Zr or Hf, $R^1$ and $R^2$ are methyl or chlorine, and $R^5$ and $R^6$ are identical or different, and are one of a halogen atom, a halogenated or unhalogenated $C_1$–$C_{10}$ alkyl group, a halogenated or unhalogenated $C_6$–$C_{10}$ aryl group, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical; wherein $R^{15}$ is one of a halogen atom, a $C_1$–$C_{10}$ alkyl group, or a $C_6$–$C_{10}$ aryl group;

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$ can form ring systems with the atoms they are connected to;

$R^8$ and $R^9$ are identical or different and have the meanings stated for $R^{11}$;

$R^{10}$ are identical or different radicals, and have the meanings stated for $R^{11}$, $R^{12}$ and $R^{13}$; two adjacent $R^{10}$ can be joined together to form a ring system.

6. A method for prepolymerizing a catalyst system comprising:
   (a) providing a catalyst system wherein the catalyst system has an activity greater than about 100,000 g/g/hr, and comprises metallocene catalyst component and a support consisting essentially of an inert solid provided that the support does not simultaneously include titanium, magnesium, and halogen;
   (b) providing at least one alpha-olefin monomer feed at a feed rate;
   (c) providing hydrogen;
   (d) combining the catalyst system, alpha-olefin monomer feed, and hydrogen under prepolymerization reaction conditions; and
   (e) recovering a prepolymerized, non-fouling, non-agglomerating supported catalyst system.

7. The method of claim 6 wherein the inert solid is inorganic.

8. A method for prepolymerizing a catalyst system comprising:
   (a) providing a catalyst system wherein the catalyst system has an activity greater than about 100,000 g/g/hr, and comprises metallocene catalyst component and a support consisting essentially of a porous inert solid provided that the support does not simultaneously include titanium, magnesium and halogen;
   (b) providing at least one alpha-olefin monomer feed at a feed rate;
   (c) providing hydrogen;
   (d) combining the catalyst system, alpha-olefin monomer feed, and hydrogen under prepolymerization reaction conditions; and
   (e) recovering a prepolymerized, non-fouling, non-agglomerating supported catalyst system.

9. The method of claim 8 wherein the porous inert solid is inorganic.

10. The method of claim 9 wherein the porous inert solid is a layered silicate.

11. The method of claim 10 wherein the layered silicate is talc.

12. A method for prepolymerizing a catalyst system comprising:
    (a) providing a catalyst system wherein the catalyst system has an activity greater than about 100,000 g/g/hr, and comprises a metallocene catalyst component and a support, provided that the support does not simultaneously include titanium, magnesium, and halogen;
    (b) providing at least one alpha-olefin monomer feed at a feed rate;
    (c) providing hydrogen;
    (d) combining the catalyst system, alpha-olefin monomer feed, and hydrogen under prepolymerization reaction conditions; and
    (e) recovering a prepolymerized, non-fouling, non-agglomerating, supported catalyst system.

13. The method of claim 12 wherein the support comprises one of inorganic oxides and resinous support materials.

14. The method of claim 13 wherein the inorganic oxides comprise a Group-2a, -3a, -4a, -4b, or -5b metal oxide.

15. The method of claim 12 wherein the inorganic oxide consists essentially of Group-2a, -3a, -4a, -4b, or -5b metal oxide.

16. The method of claim 12 wherein the inorganic oxide consists essentially of silica, magnesia, alumina, titania, zirconia, or their mixtures.

17. The method of claim 1 wherein the catalyst has an activity or greater than about 150,000 g/g/hr.

18. The method of claim 17 wherein the monomer feed is ethylene.

19. The method of claim 17 wherein the monomer feed is propylene.

20. The method of claim 1 wherein hydrogen is added in an amount between about 0.1 to about 10 mole percent relative to the monomer feed rate.

21. The method of claim 20 wherein hydrogen is added between about 0.5 to about 6 mole percent.

22. The method of claim 21 wherein hydrogen is added between about 1 to about 3 mole percent.

23. The method of claim 1 wherein the monomer feed is added at a rate of about 0.1 to about 10 g olefin/g catalyst solid/hour.

24. The method of claim 23 wherein the monomer feed is added at a rate of about 0.1 to about 5 g olefin/g catalyst solid/hour.

25. The method of claim 24 wherein the monomer feed is added at a rate of about 0.5 to about 1.5 g olefin/g catalyst solid/hour.

26. The method of claim 1 wherein the catalyst system has an activity of greater than about 200,000 g/g/hr.

27. The method of claim 26 wherein the catalyst system has an activity of from about 150,000 g/g/hr. to about 1,000,000 g/g/hr.

28. The method of claim 1 wherein the prepolymerization is conducted at a temperature that is in the range of from about 0 to about 10° C.

29. The method of claim 1 wherein the supported catalyst system comprises a metallocene catalyst component represented by the formula:

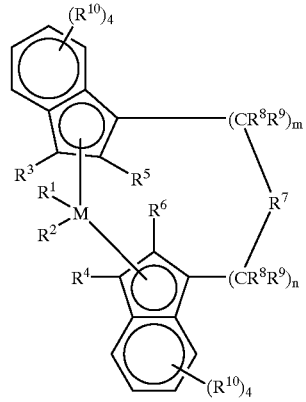

wherein $M^1$ is a metal of Group 4, 5, or 6 of the Periodic Table; $R^1$ and $R^2$ are identical or different, are one of a hydrogen atom, a $C_1$–$C_{10}$ alkyl group, a $C_1$–$C_3$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_7$–$C_{40}$ arylalkyl group, a $C_7$–$C_{40}$ alkylaryl group, a $C_8$–$C_{10}$ arylalkenyl group, or a halogen atom; $R^3$ and $R^4$ are hydrogen atoms; $R^5$ and $R^6$ are identical or different, preferably identical, and are one of a halogen atom, $C_1$–$C_{10}$ alkyl group, which may be halogenated, a $C_6$–$C_{10}$ aryl group, which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group; $R^7$ is

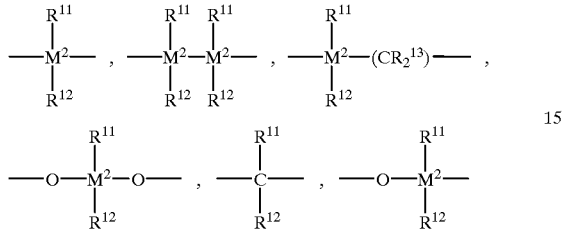

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$; wherein: $R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems; $M^2$ is silicon, germanium or tin; $R^8$ and $R^9$ are identical or different and have the meanings stated for $R^{11}$; m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$; two adjacent $R^{10}$ radicals can be joined together to form a ring system.

30. The method of claim 29 wherein $M^2$ is silicon.

31. The method of claim 1 wherein the metallacene catalyst system comprises a metallocene component represented by the formula:

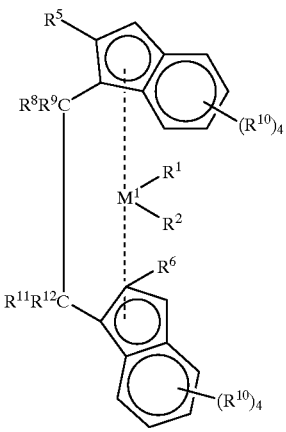

(A)

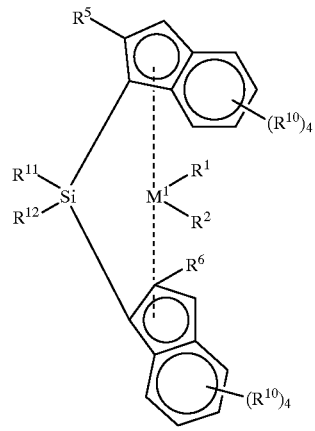

(B)

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the meanings as defined in claim 4.

* * * * *